Sept. 16, 1947.   C. M. SAVRDA ET AL   2,427,626
TRACTION DISCS
Filed May 9, 1944   4 Sheets-Sheet 1

INVENTORS
CHARLES M. SAVRDA
AND WILLIAM H. HUNT
BY
Wm. S. Pritchard
ATTORNEY.

Sept. 16, 1947.  C. M. SAVRDA ET AL  2,427,626
TRACTION DISCS
Filed May 9, 1944  4 Sheets-Sheet 2

INVENTORS
CHARLES M. SAVRDA
AND WILLIAM H. HUNT
BY
ATTORNEY.

Sept. 16, 1947.　　C. M. SAVRDA ET AL　　2,427,626
TRACTION DISCS
Filed May 9, 1944　　4 Sheets-Sheet 3

INVENTORS
CHARLES M. SAVRDA
AND WILLIAM H. HUNT
BY
ATTORNEY

Sept. 16, 1947.　　C. M. SAVRDA ET AL　　2,427,626
TRACTION DISCS
Filed May 9, 1944　　4 Sheets-Sheet 4
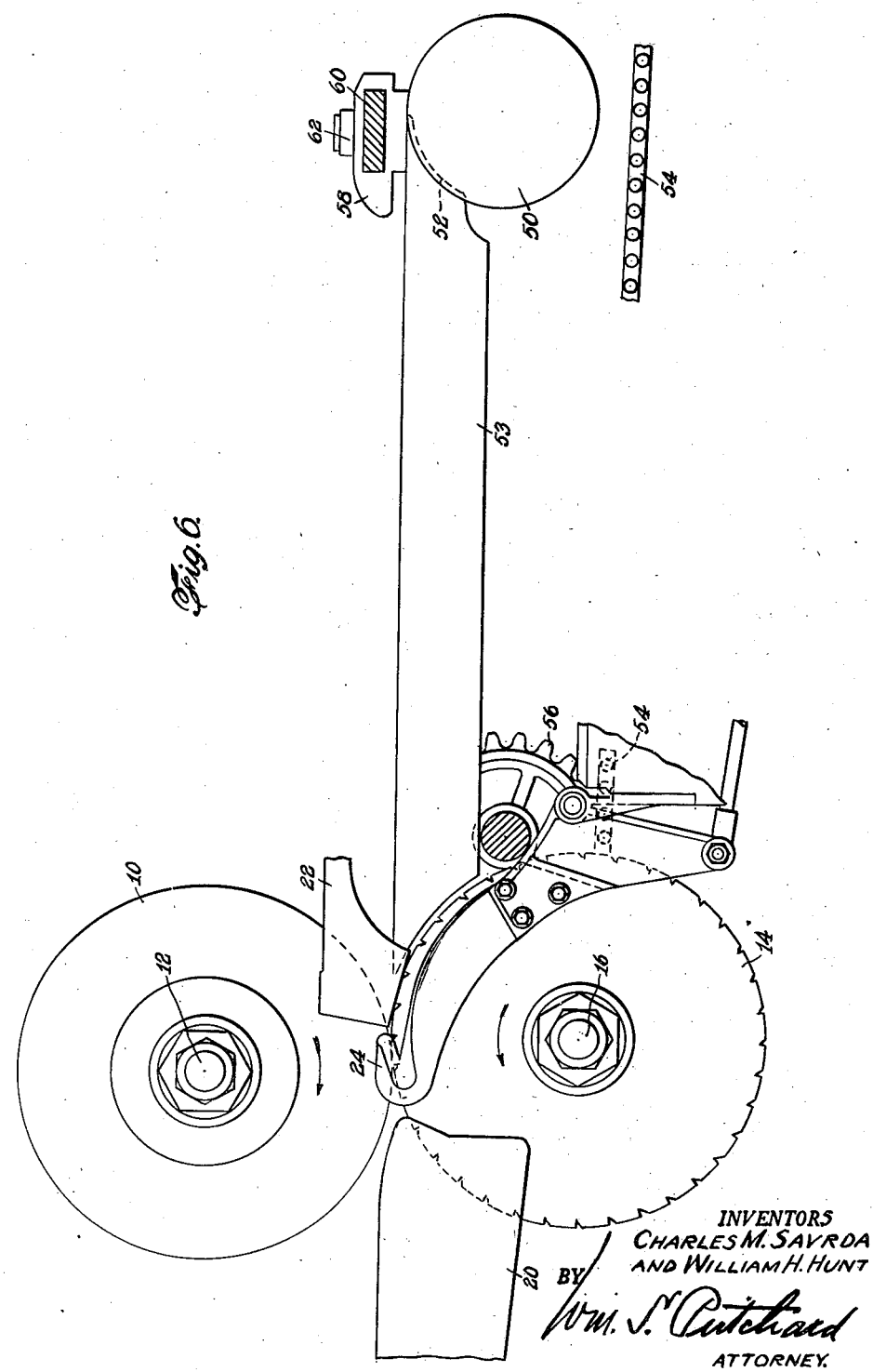

Patented Sept. 16, 1947

2,427,626

UNITED STATES PATENT OFFICE 2,427,626

TRACTION DISCS

Charles M. Savrda, Bay Shore, N. Y., and William H. Hunt, National City, Calif., assignors to The Atlantic Coast Fisheries Company, New York, N. Y., a corporation of Maine Application May 9, 1944, Serial No. 534,708

10 Claims. (Cl. 17—4)

This invention relates to fish filleting machines, and more particularly to the traction discs co-operating with the slitting knives which slit the belly side of a fish.

United States Patent 2,149,021 discloses a fish filleting machine wherein a fish, tail leading and back downward, is first cut inwardly from its back throughout its length and almost to the backbone and thereafter passed through the zone of action of a pair of circular belly-slitting knives which slit the belly side of the fish. During the belly-slitting operation, the fish is supported upon the pair of rotating guide discs. The guide discs and the circular belly-slitting knives are rotated at high peripheral speed. When the fish leaves the zone of action of the belly-slitting knives, each fillet remains attached to the ribs of the fish and also the backbone of the fish between the cuts from the back and the belly. Due to the rotation of the belly-slitting knives and the supporting guide discs, the fish is projected onto a pair of ribbing knives which sever the fillets from the backbone and the ribs. A ribbing conveyer serves to maintain the fish in contact with the ribbing knives and feed the fish thereover.

As is apparent from the foregoing description, the guide discs support the fish during the slitting on the belly side thereof and also aid in the projection of the fish from the zone of action of the knives. Due to the rotation of the discs, the latter have a tendency to force the fish upwardly and also to project the fish upwardly as it leaves the zone of action of the belly knives.

An object of this invention is to provide new and improved discs for supporting and gripping a fish while it passes through the zone of action of the belly-slitting knives.

Another object of this invention is to provide traction discs which engage the back spike of the fish and urge it downwardly as it passes through the zone of action of the belly-slitting knives.

An additional object of this invention is to provide traction discs having under-cuts which hold and grip the knuckles.

A further object of this invention is to provide traction discs having means cooperating with the back spikes so that the knuckles will be fed into an under-cut.

Other and additional objects will become apparent hereinafter.

The above objects are accomplished, in general, by providing a pair of circular traction discs spaced from each other sufficiently to support the backbone of a fish while it passes through the zone of action of belly-slitting knives and also permit the back spikes to extend therebetween. In order to inhibit any cutting action, each disc is, on its inner surface, provided with a beveled edge. The discs are also provided on their inner surfaces with means to receive and grip a knuckle of the fish as the fish passes thereover. The discs are also provided on their inner surfaces with means which engage the back spike extending therebetween and urge it downwardly, whereby the knuckle is positioned and seized. The discs are further provided with means which will sever the skin adjacent the tail when said skin is depressed thereon.

The specific details of construction of an embodiment of the invention will now be described in connection with the drawings, wherein an illustrative embodiment thereof is shown and wherein:

Figure 2 is a side elevation of the interior surface of the front disc shown in Figure 1a.

Figure 6 is an elevation, partly in section and partly broken away, of a filleting machine showing diagrammatically the means for making the preliminary incisions in the back of a fish and the means for conveying the fish to the mechanism of the invention.

Figure 1:
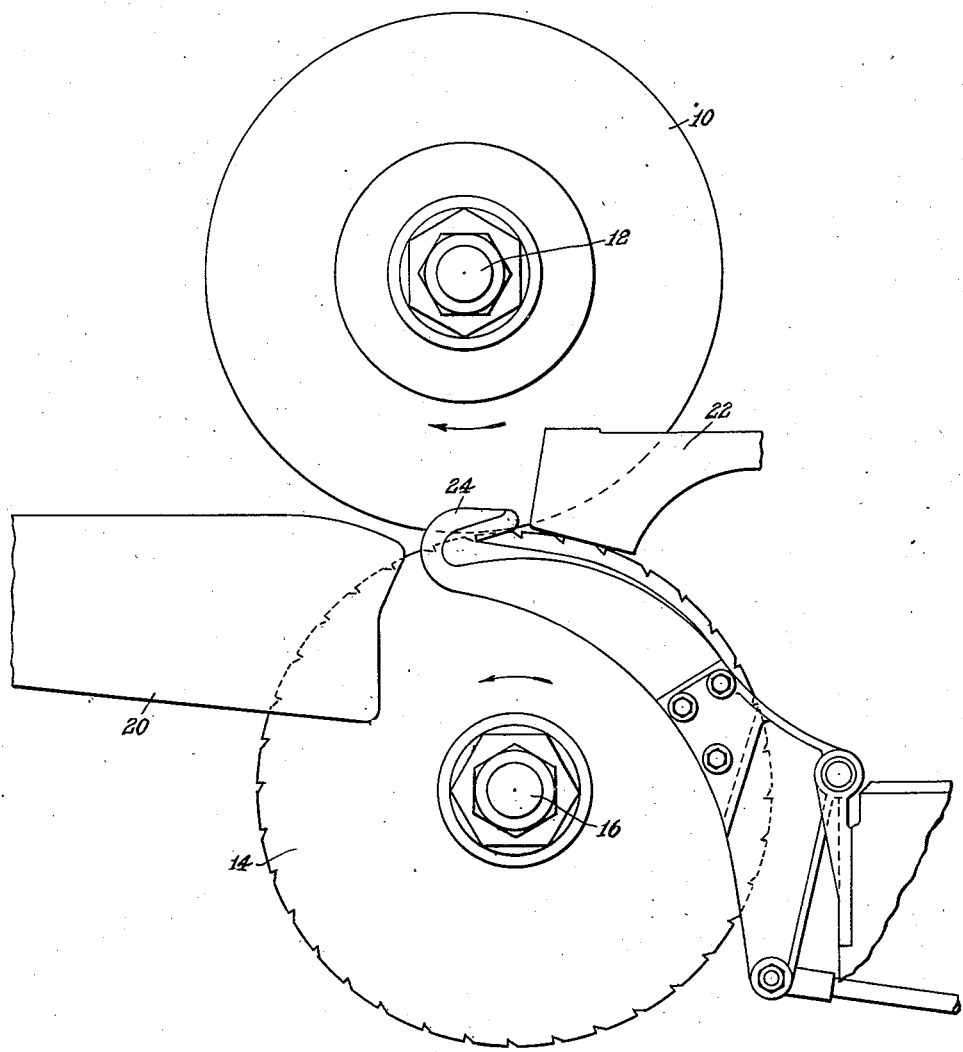
Figure 1 is a side elevation of the traction discs constituting the instant invention in position in a filleting machine, only such parts being shown as are necessary for the operation.
Figure 1A:
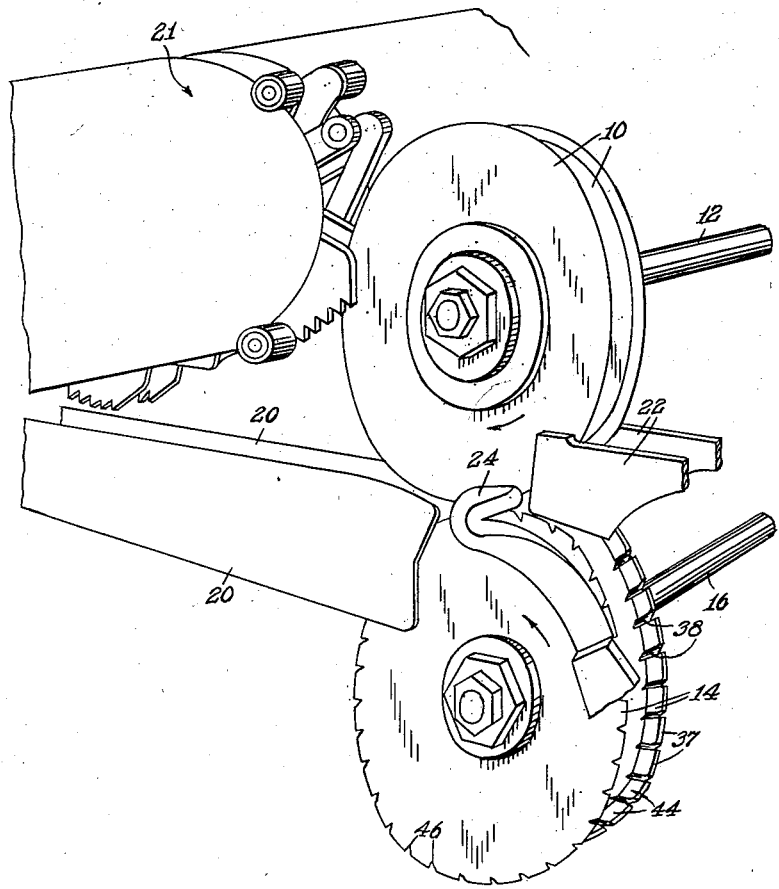
Figure 1a is a perspective view of the apparatus shown in Figure 1 and including a part of the ribbing conveyer.
Figure 2:
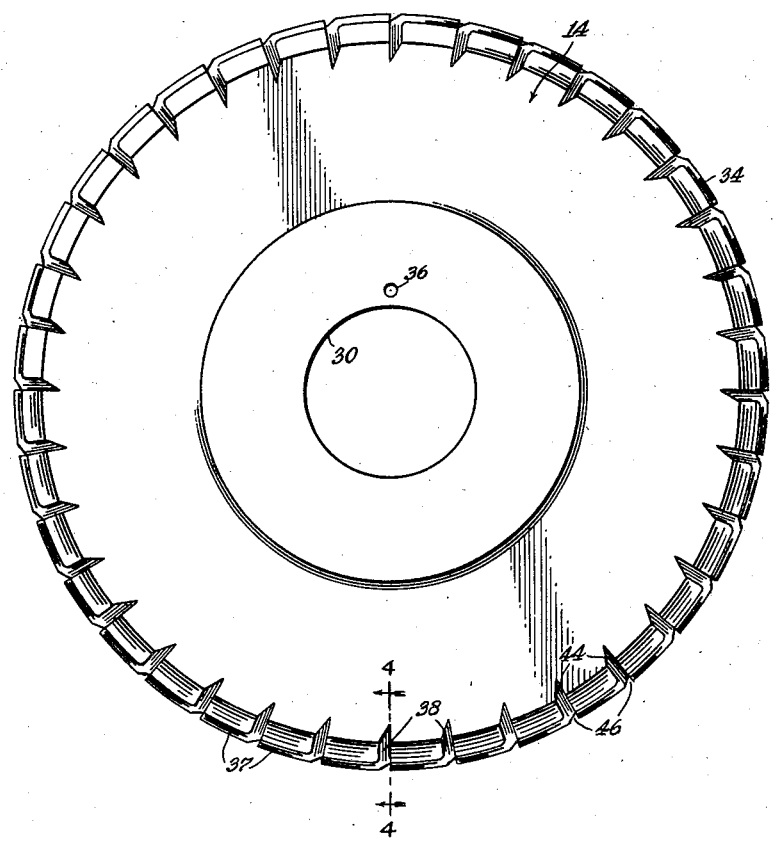
Figure 3:
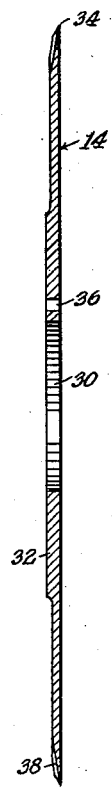
Figure 3 is a vertical section of Figure 2.
Figure 4:
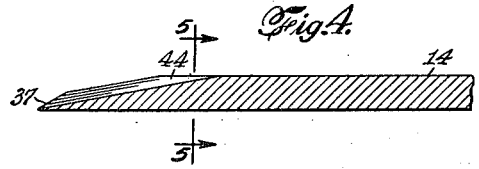
Figure 4 is an enlarged section taken on the line 4—4 of Figure 2.
Figure 5:
Figure 5 is a section taken on the line 5—5 of Figure 4.

Referring now to the drawings wherein like reference numerals designate like parts, the reference numeral 10 designates a pair of circular rotary belly-slitting knives which are rotatably mounted on a shaft 12 appropriately journaled in the frame of the machine (not shown). Positioned beneath the belly-slitting knives 10 are a pair of traction discs 14 which are rotatably mounted on a shaft 16 appropriately journaled in the frame of the machine (not shown). The belly-slitting knives 10 are spaced relative to each other sufficiently to make a pair of parallel incisions closely contiguous to and on opposite sides of the belly spikes almost up to the backbone. The traction discs 14, hereinafter more fully explained, and the belly-slitting knives 10 are rotated at high speeds.

The precise manner of mounting and driving the belly-slitting knives 10 and the traction discs 14 form no part of this invention. They may be mounted in the machine and driven as shown, for example, in Figure 33 of United States Patent 2,149,021, or in Figure 1 of United States Patent 2,149,022.

At the discharge end of the belly-slitting knives 10, there is provided a pair of spaced ribbing knives 20 which may be of the type shown in United States Patent 2,179,821 or in copending application Serial No. 534,847, now Patent 2,400,118. Cooperating with the ribbing knives 20 is a ribbing conveyer, generally designated by the reference numeral 21, which is adapted to engage the fish and convey it across the ribbing knives. A suitable ribbing conveyer is shown in United States Patent 2,149,021 or in copending application Serial No. 530,967, now Patent 2,397,158.

At the entry end of the belly-slitting knives 10, a guide 22 may be provided which is appropriately mounted on the frame of the machine and is designed to guide the fish in proper position into the zone of action of the belly-slitting knives 10 and the cooperating traction discs 14. The guide 22 may straighten and comb the fins on the belly side of the fish passing therebetween so that they will pass between the belly-slitting knives 10.

A hooked member 24, of the type shown in United States Patent 2,149,022, preferably is provided to engage the skin or flesh adjacent the tail of the fish and dispose said skin or flesh in position so that it can be severed by the traction discs 14, as hereinafter more fully described.

The specific details of construction of the belly-slitting knives 10, the ribbing knives 20, the guide 22 and the hooked member 24 form no essential part of this invention, and further detailed description is deemed unnecessary.

Each of the traction discs 14 is circular in shape and provided with a central aperture 30 whereby it may be positioned and secured on the shaft 16. Each disc is provided on its inner surface with a shoulder 32 whereby, when the two discs are positioned on the shaft 16 and the shoulders 32 brought into opposed contiguous relationship, the discs will be properly and sufficiently spaced to permit the back spikes to pass therebetween and support the backbone on the peripheral edges 34 of the discs. Each disc is provided with an aperture 36 in the shoulder thereof whereby, by any appropriate means such as a pin (not shown), the two discs may be maintained together with the notches in aligned relationship.

Both of the discs 14 enter into incisions (previously made by mechanisms not a part of this invention) in the back of the fish and extend throughout the length of the fish and almost up to the backbone. As disclosed in U. S. Patents 2,149,021 and 2,149,022, these incisions are made by a pair of rotating circular knives 50, which make a preliminary incision in the back of the fish through the skin, and by a pair of piercing knives 52 which enter through the slits formed by the knives 50 until they are in engagement with the backbone. The piercing knives 52 tend to follow along the backbone while continued movement of the fish causes the knives 50 to cut the skin of the fish and complete the action of the piercing knives. The piercing knives 52 are provided at the forward portion of a pair of elongated guide plates 53 which are, as shown in U. S. Patents 2,149,021 and 2,149,022, disposed in close proximity to each other and arranged to shift longitudinally so that when in their forward position the piercing knives 52 extend forwardly of the back-slicing knives 50 in such a manner as to engage the backbone of the fish and ride therealong, whereby the back extensions of the vertebrae are guided accurately between the knives 50.

The fish is fed over the back-slitting means and onto the traction discs into the zone of action by conveying means, as disclosed in said U. S. Patents 2,149,021 and 2,149,022. In general, such conveying means comprises a pair of endless chains 54, only a portion of one of which is shown in Figure 6 traveling in parallel planes over sprockets 56 at one end and similar sprockets at the other end (not shown). Secured to the chains 54 at spaced intervals are traveller members 58 which provide guide bearings for transversely movable bars 60. The traveller members 58 are attached to the pairs of chains in oppositely disposed pairs, and the bars 60 of each pair are caused at proper times to move toward and away from each other in the travellers by cam mechanism (not shown). The adjacent ends of the bars 60 are provided with roughened gripping plates 62 for engaging the tail of the fish.

The tail of a fish, tail leading and back downward, is gripped between the plates 62 of a pair of bars 60 at the feed end of the machine. The belly-cutting knives 10 and the traction discs 14 rotate at high speeds and the peripheral speed thereof is greater than the movement of the traveller members 58. Therefore, and as is disclosed in U. S. Patents 2,149,021 and 2,149,022, the fish is released from between the bars 60 before the fish passes into the zone of action of said belly-cutting knives and traction discs and, upon release, the fish is caught by the guide plates 53 which feed it into the zone of action of said belly-cutting knives and traction discs.

In order to inhibit cutting of the ribs, the peripheral edge 34 of each disc is beveled, as indicated by the reference numeral 37, on the inner side thereof.

For the purpose of gripping the backbone, particularly at the knuckles, each disc 14 is, at spaced intervals on its inner surface and around its periphery, provided with an inclined under-cut 38 having a shoulder 40 normal to the face of the disc. Frequently, a knuckle will not directly enter the under-cut 38 and accordingly it is desirable in such cases to force the knuckles to enter the under-cut 38. In general, this is accomplished by means pulling downwardly on the back spikes extending between the discs. Such means may be obtained by appropriately shaping the inner surfaces of the dics between successive under-cuts so that they will grip the spike extending therebetween and urge it downwardly during the rotation of said discs. In the form shown, the discs have portions intermediate successive under-cuts 38 which are inclined in the direction toward the center of the disc, as indicated by the reference numeral 44. Normally the angle of inclination of the portions 44 is less than the angle of the bevel 37. Thus, when a back spike is received between the inclined portions 44, such back spike will be urged downward and the knuckles caused to enter an under-cut 38.

Each disc is also provided with a plurality of notches 46 around the periphery thereof which are adapted to sever the skin adjacent the tail of the fish, which preferably is brought into such position by the hooked member 24.

The number of under-cuts 38 and the spacing thereof depend on the size of the traction discs. In general, the shapes and sizes of the under-cuts 38, the inclined surfaces 44 and the notches 46 are such as to be capable of use in connection with various sizes or range of sizes of fish.

The instant invention, as apparent from the foregoing, provides a pair of traction discs which, in addition to supporting a fish while the belly side thereof is being slit, also serve to grip and hold the fish in such a manner as to prevent it from kicking up or being fed from the zone of action of the belly knives in an upward direction.

Since it is obvious that various changes and modifications may be made in the above description without departing from the nature or spirit thereof, this invention is not restricted thereto except as set forth in the appended claims.

We claim:

1. In a fish filleting machine having means to make a pair of incisions through the back and almost to the backbone of a fish, a pair of rotary circular knives to make a pair of incisions in the belly side and almost to the backbone, a pair of rotary traction discs below the circular knives to enter the incisions in the back of the fish, said discs being spaced sufficiently to support the backbone of the fish during the action of the cutting knives and permit the back spikes to extend downwardly therebetween, said discs having means to receive and hold the knuckles of said spikes.

2. In a fish filleting machine having means to make a pair of incisions through the back and almost to the backbone of a fish, a pair of rotary circular knives to make a pair of incisions in the belly side and almost to the backbone, and a pair of rotary traction discs below the circular knives to enter the incisions in the back of the fish, said discs being spaced sufficiently to support the backbone of the fish during the action of the cutting knives and permit the back spikes to extend downwardly therebetween, said discs having spaced under-cuts to receive and hold the knuckles of said spikes.

3. In a fish filleting machine having means to make a pair of incisions through the back and almost to the backbone of a fish, a pair of rotary circular knives to make a pair of incisions in the belly side and almost to the backbone, and a pair of rotary traction discs below the circular knives to enter the incisions in the back of the fish, said discs being spaced sufficiently to support the backbone of the fish during the action of the cutting knives and permit the back spikes to extend downwardly therebetween, said discs having means to receive and hold the knuckles of said spikes and means to engage the back spikes extending between said discs and pull them downwardly.

4. In a fish filleting machine having means to make a pair of incisions through the back and almost to the backbone of a fish, a pair of rotary circular knives to make a pair of incisions in the belly side and almost to the backbone, and a pair of rotary traction discs below the circular knives to enter the incisions in the back of the fish, said discs being spaced sufficiently to support the backbone of the fish during the action of the cutting knives and permit the back spikes to extend downwardly therebetween, said discs having spaced under-cuts to receive and hold the knuckles of said spikes and means to engage the back spikes extending between said discs and pull them downwardly.

5. In a fish filleting machine having means to make a pair of incisions through the back and almost to the backbone of a fish, a pair of rotary circular knives to make a pair of incisions in the belly side and almost to the backbone, and a pair of rotary traction discs below the circular knives to enter the incisions in the back of the fish, said discs being spaced sufficiently to support the backbone of the fish during the action of the cutting knives and permit the back spikes to extend downwardly therebetween, said discs having spaced under-cuts to receive and hold the knuckles of said spikes and inclined surfaces to grip the back spikes therebetween and pull them downwardly.

6. In a fish filleting machine having means to make a pair of incisions through the back and almost to the backbone of a fish, a pair of rotary circular knives to make a pair of incisions in the belly side and almost to the backbone, a hooked member to engage the skin adjacent the tail and depress the same, and a pair of rotary traction discs below the circular knives to enter the incisions in the back of the fish, said discs being spaced sufficiently to support the backbone of the fish during the action of the cutting knives and permit the back spikes to extend downwardly therebetween, said discs having means to receive and hold the knuckles of said spikes and a plurality of notches in the periphery of each disc, each notch being aligned with an under-cut and adapted to sever the skin depressed by the hooked member.

7. In a fish filleting machine having means to make a pair of incisions through the back and almost to the backbone of a fish, a pair of rotary circular knives to make a pair of incisions in the belly side and almost to the backbone, a hooked member to engage the skin adjacent the tail and depress the same, and a pair of rotary traction discs below the circular knives to enter the incisions in the back of the fish, said discs being spaced sufficiently to support the backbone of the fish during the action of the cutting knives and permit the back spikes to extend downwardly therebetween, said discs having spaced undercuts to receive and hold the knuckles of said spikes and a plurality of notches in the periphery of each disc, each notch being aligned with an under-cut and adapted to sever the skin depressed by the hooked member.

8. In a fish filleting machine having means to make a pair of incisions through the back and almost to the backbone of a fish, a pair of rotary circular knives to make a pair of incisions in the belly side and almost to the backbone, a hooked member to engage the skin adjacent the tail and depress the same, and a pair of rotary traction discs below the circular knives to enter the incisions in the back of the fish, said discs being spaced sufficiently to support the backbone of the fish during the action of the cutting knives and permit the back spikes to extend downwardly therebetween, said discs having means to receive and hold the knuckles of said spikes, means to engage the back spikes extending between said discs and pull them downwardly, and a plurality of notches in the periphery of each disc, each notch being aligned with an under-cut and adapted to sever the skin depressed by the hooked member.

9. In a fish filleting machine having means to make a pair of incisions through the back and almost to the backbone of a fish, a pair of rotary circular knives to make a pair of incisions in the belly side and almost to the backbone, a hooked member to engage the skin adjacent the tail and depress the same, and a pair of rotary traction discs below the circular knives to enter the incisions in the back of the fish, said discs being spaced sufficiently to support the backbone of the fish during the action of the cutting knives and permit the back spikes to extend downwardly therebetween, said discs having spaced under-cuts to receive and hold the knuckles of said spikes, means to engage the back spikes extending between said discs and pull them downwardly, and a plurality of notches in the periphery of each disc, each notch being aligned with an under-cut and adapted to sever the skin depressed by the hooked member.

10. In a fish filleting machine having means to make a pair of incisions through the back and almost to the backbone of a fish, a pair of rotary circular knives to make a pair of incisions in the belly side and almost to the backbone, a hooked member to engage the skin adjacent the tail and depress the same, and a pair of rotary traction discs below the circular knives to enter the incisions in the back of the fish, said discs being spaced sufficiently to support the backbone of the fish during the action of the cutting knives and permit the back spikes to extend downwardly therebetween, said discs having spaced under-cuts to receive and hold the knuckles of said spikes, inclined surfaces to grip the back spikes therebetween and pull them downwardly, and a plurality of notches in the periphery of each disc, each notch being aligned with an under-cut and adapted to sever the skin depressed by the hooked member.

CHARLES M. SAVRDA.
WILLIAM H. HUNT.

REFERENCES CITED

The following references are of record in the file of this patent:

UNITED STATES PATENTS

| Number | Name | Date |
| --- | --- | --- |
| 2,137,291 | Hunt | Nov. 22, 1938 |
| 2,149,021 | Hunt | Feb. 28, 1937 |
| 2,149,022 | Hunt | Feb. 28, 1939 |
| 2,179,821 | Hunt | Nov. 14, 1939 |